United States Patent
Segal

(10) Patent No.: US 8,732,021 B2
(45) Date of Patent: May 20, 2014

(54) METHOD AND SYSTEM FOR REDUCING CONSUMPTION OF ADDICTIVE COMMODITIES

(75) Inventor: Jeffrey J. Segal, Greensboro, NC (US)

(73) Assignee: Medical Justice Corp., Greensboro, NC (US)

( * ) Notice: Subject to any disclaimer, the term of this patent is extended or adjusted under 35 U.S.C. 154(b) by 1818 days.

(21) Appl. No.: 11/937,628

(22) Filed: Nov. 9, 2007

(65) Prior Publication Data

US 2009/0012871 A1 Jan. 8, 2009

Related U.S. Application Data

(60) Provisional application No. 60/948,142, filed on Jul. 5, 2007.

(51) Int. Cl.
*G06Q 20/00* (2012.01)
(52) U.S. Cl.
USPC .................................. 705/17; 705/16; 705/19
(58) Field of Classification Search
None
See application file for complete search history.

(56) References Cited

U.S. PATENT DOCUMENTS

| 6,078,898 | A | 6/2000 | Davis et al. | |
|---|---|---|---|---|
| 2003/0200110 | A1* | 10/2003 | Munechika et al. | 705/1 |
| 2005/0102240 | A1* | 5/2005 | Misra et al. | 705/59 |
| 2006/0190324 | A1* | 8/2006 | Adkins et al. | 705/14 |

* cited by examiner

*Primary Examiner* — F. Zeender
*Assistant Examiner* — Christopher Buchanan
(74) *Attorney, Agent, or Firm* — Ropes & Gray LLP; Jeffrey H. Ingerman

(57) ABSTRACT

A method of controlling consumption of a commodity, particularly an addictive commodity, includes issuing a license, in advance of any purchase, to a purchaser of the commodity. The license allows purchase of a specified quantity of the commodity within a specified time period. The license is issued for a license fee that is set according to a schedule that divides the specified quantity into ranges, and charges different per unit base fees for purchases in different ones of those ranges. When a purchase is made, the license is checked to see if the purchase is allowed, and then updated to reflect the quantity purchased. Excessive consumption may be penalized by charging a higher rate for a new license in the same period, while surrender of one's license may be rewarded with incentives. The license fee may include the purchase price of the licensed quantity of the commodity.

20 Claims, 10 Drawing Sheets

METHOD AND SYSTEM FOR REDUCING CONSUMPTION OF ADDICTIVE COMMODITIES

CROSS REFERENCE TO RELATED APPLICATION

This claims the benefit of copending, commonly-assigned U.S. Provisional Patent Application No. 60/948,142, filed Jul. 5, 2007, which is hereby incorporated by reference herein in its entirety.

BACKGROUND OF THE INVENTION

Society has an interest in restricting the consumption of specific commodities, and particularly commodities that may be classified as addictive, whose unrestricted demand is high. As used in the context of this invention, addiction can be physiological (where withdrawal symptoms are noted upon cessation of use), psychological (where there is a behavioral urge to use/abuse the commodity, but there is no clear-cut withdrawal complex), or and metaphorical (where demand remains high in spite of recognized long-term negative consequences). An example of a physiological addiction might include tobacco/nicotine. An example of metaphorical addiction might include the use of large and increasing amounts of petroleum products as a fuel, notwithstanding price increases and recognized negative health and environmental consequences, which was characterized by the President of the United States as an "addiction" in an address on Jan. 31, 2006.

Society's interest in restricting the use of such commodities may clash with a libertarian ethos such as that of the United States, where individuals are generally free to do as they choose, as long as they do not harm others. This clash manifests itself in the near free availability of specific commodities whose cost to individuals does not necessarily reflect the aggregate cost to society. Two examples are cigarettes and gasoline, both of which are "addictive" in some sense.

Cigarettes create negative implications for health care. They are highly physiologically addictive. Most smokers start their habit in adolescence and struggle to quit, even though over 80% express a strong desire to quit. Smoking has been identified as one of the major preventable causes of disease. The costs created by those who smoke are borne directly by all who purchase health insurance and indirectly by those who pay taxes (paying into government subsidized health care programs, such as Medicare and Medicaid in the United States). If fewer people smoked, fewer people would become ill, and more people would stay healthier longer. The cost of health care for all would decrease. The price smokers pay to smoke is far lower than the aggregate cost paid by society to deal with smokers' health problems. Further, when smokers make their purchases, the money they pay primarily benefits manufacturers and vendors of cigarettes, and does not substantively contribute to payment of health care costs relating to smoking.

Gasoline is also a commodity that creates problems when consumed excessively. Most countries import petroleum and/or petroleum products from geopolitically volatile regions. Because of that, foreign policy often is dictated by energy policy, as opposed to the other way around. Many countries (particularly those that are net importers of petroleum) lose their diplomatic leverage because they are dependent on suppliers. Further, burning "too much" gasoline has negative consequence for the environment and global climate. Again, the cost paid by individuals for gasoline in many countries does not adequately reflect the aggregate cost paid by society. If nothing else, a strong military must be formed to ensure a steady supply of imported petroleum for those countries. If that supply is cut off, it could paralyze a country's economy rather quickly.

Societies can diminish demand for such commodities in a number of ways, including (a) education, (b) creation of mandated standards and laws (such as laws preventing selling cigarettes to minors; or requiring automobile manufacturers to manufacture vehicles that meet minimum mileage standards), and (c) manipulation of price, most notably by taxation. In the case of taxation, items ordinarily are taxed in a uniform way, regardless of whether the consumer purchases a small amount or large amount of the commodity.

SUMMARY OF THE INVENTION

The commodities that are the primary targets of this invention are those which are associated with a relatively high aggregate cost to society, but, generally, a lower cost to the individual consumer of the commodity. Further, there is often strong demand for such commodities. Such demand is associated with either physiological, psychological, or metaphorical addiction. There would be a benefit to creating incentives that reward individuals who purchase smaller quantities of such commodities and penalize individuals who purchase larger quantities of such commodities.

The invention includes both a system and a method for imposing variable pricing for addictive commodities. The price preferably increases, preferably nonlinearly, for increased purchases within a particular time frame. In accordance with the invention, a license is provided to an individual to enable purchase of such addictive commodities. The license preferably is entered into a database that preferably determines eligibility for, and the price of, future purchases. Such eligibility might be calculated by looking at past purchases of the commodity within a particular time period.

In one embodiment, licensed activity involves coordination with a database at or near the time the individual wishes to make a purchase. In response to an electronic query for approval to purchase an addictive commodity, the system may compare past consumption of the commodity by that individual, as recorded in the database, with the intended purchase. If the licensee is eligible to make the purchase, the system may calculate the price. A component of the price will be a disincentive cost. (Part or all of the disincentive cost, such as a tax, will ultimately be transferred to an entity other than the collecting entity, such as a government entity.) The greater the consumption of the addictive commodity within a time period, the greater the calculated cost. The cost may increase in a nonlinear way (although the rate of cost increase may be linear). The individual then consummates the purchase based on the calculated price. In one variant, the system might enable display of the calculated price before the transaction is consummated. The database will then record the purchase, allowing the system to calculate future rights to purchase addictive commodities within the specified time interval. Optionally, the system might allow for transfer of funds to consummate the purchase via credit card, debit card, or other type of electronic transfer of funds. In addition, the system might automatically allocate the purchase price between the vendor and the recipient of the disincentive cost, and transfer the funds accordingly.

In another embodiment of the invention, to obtain a license the individual prepays for the right to purchase an addictive commodity with a particular time period. The prepayment might include only the disincentive cost, or the disincentive cost plus part or all of the cost of the commodity. The prepayment made is recorded in the database and applied to purchases made within the specified time frame. When the individual attempts to make a purchase, the license is used to query the database. The system will calculate the cost of the purchase taking into account past consumption by that individual. The greater the frequency of consumption within a time interval, the greater the cost of the intended purchase. And the cost may increase in a nonlinear way (although the rate of cost increase may be linear). If there are adequate funds remaining from the initial prepayment, the purchase is allowed, and some or all of the cost of the transaction is deducted from the remaining portion of the initial prepayment. In addition, the system might automatically allocate the purchase price between the vendor and the recipient of the disincentive cost, and transfer the funds accordingly.

In another version, the prepayment enables the licensee to purchase a specific amount of the addictive commodity within a specified time period from a vendor, and the prepaid amount is stored on a license card. The greater the frequency of intended consumption within a time interval, the greater the cost. And the cost may increase in a nonlinear way (although the rate of cost increase may be linear). When the individual attempts to make a purchase, the value stored on the license card is checked, and if sufficient rights to make such a purchase remain, the purchase is consummated and the amount purchased is debited from the stored value. In addition, the system might automatically allocate the purchase price between the vendor and the recipient of the disincentive cost, and transfer the funds accordingly.

In a variant of either prepaid embodiment (either the database-lookup or the stored-value-card), if during the specified time frame, the licensee uses up the prepayment and wants to purchase additional quantities of the commodity, the price (or the disincentive portion of the price) is set higher than if the licensee had purchased a license for the larger total quantity in the first instance.

Thus, in accordance with the invention, there is provided a method of controlling consumption of a commodity. The method includes issuing a license, in advance of any purchase, to a purchaser of the commodity. The license allows purchase of a specified quantity of the commodity within a specified time period. The license is issued for a license fee, and the license fee is set according to a first schedule that divides the specified quantity into ranges, and charges different per unit base fees for purchases in different ones of those ranges.

Apparatus for implementing the method also is provided.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION

Figure 1:
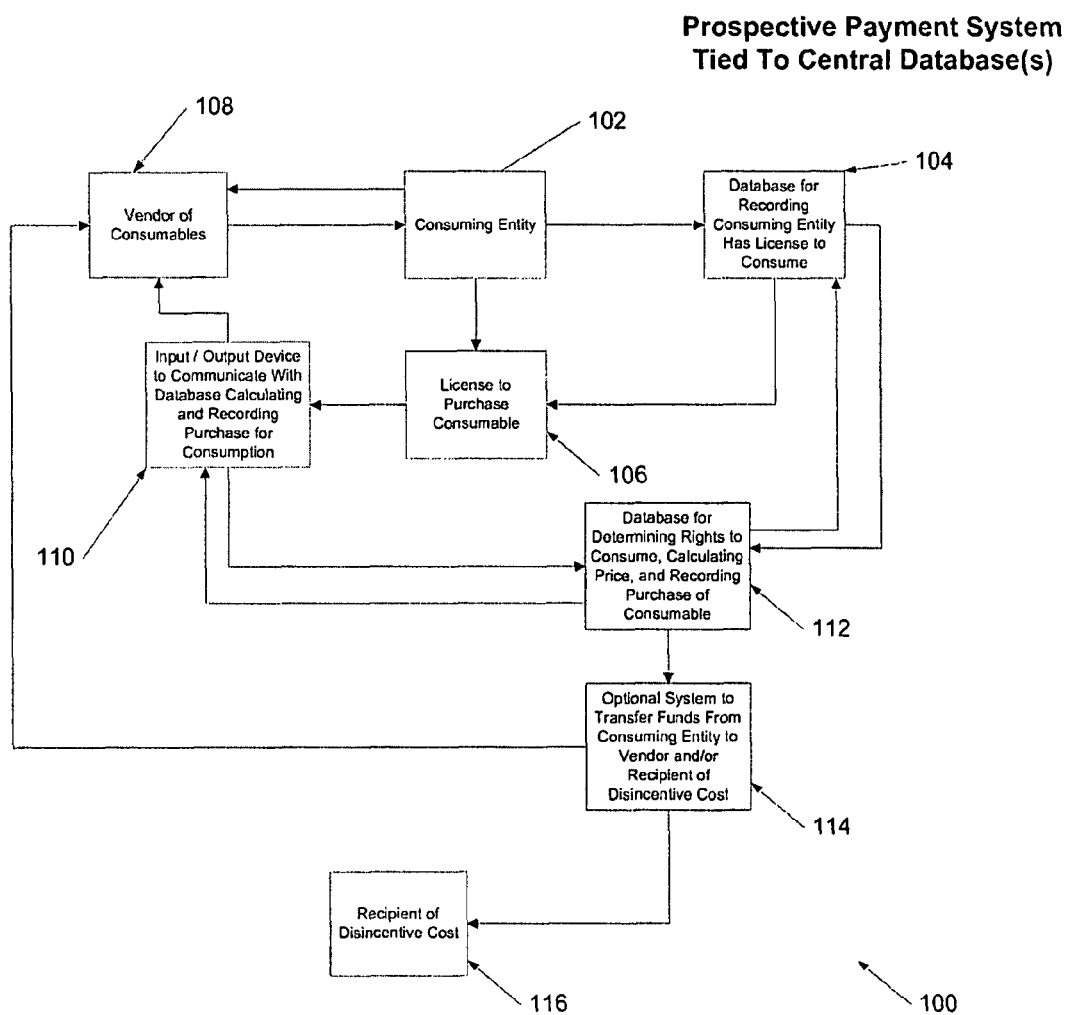
FIG. 1 is a schematic diagram showing a prospective payment system tied to central database(s)

The invention incorporates variable pricing of an addictive commodity, with the price preferably increasing progressively based on increasing consumption within a specified time interval. The increasing pricing may be imposed as a "disincentive fee" such as a tax. The total price preferably comprises the disincentive fee and the underlying cost of the commodity to the consumer. (The "underlying cost" to consumer would include components such as wholesale price, profit for vendor, administrative costs, and the like.) For example, someone who purchases one pack of cigarettes per day might pay a tax of one dollar per pack. Someone who purchases two packs of cigarettes per day might pay two dollars per pack. According to that model, the someone who smokes twice as much as someone else does not pay double the tax to pay for his habit, but actually pays four times as much. Similarly, a motorist who purchases twenty unit volumes (e.g., gallons or liters) of gasoline per week might pay one dollar per unit volume of gasoline in tax (for a total of twenty dollars). A motorist who purchases forty unit volumes in that week might pay $1.50 in tax per unit volume of gasoline. Or he might pay one dollar for the first twenty unit volumes, then $2.00 for the next twenty unit volumes. Either way, it becomes more expensive to purchase greater quantities of a commodity in a specified time interval and this increase may not necessarily be linear.

One variation includes a stair-step increase based on volume purchased or consumed. The size of the "stair-step" could be large or small. For example, a large stair-step might allow for cigarette consumption of one pack per day for one year to be taxed at $1 per day, and two packs per day for one year to be taxed at $2 per day. A small stair-step might encompass a system whereby the first pack of cigarettes purchased in a specified time period may have the lowest tax, such as $0.10. The next pack of cigarettes may have a tax of $0.15, and so on. There are a number of individual variations which can be implemented, all of which conform to the paradigm of incremental increase in cost for an addictive commodity based on increased amount of purchase and/or consumption within a predetermined time interval. Other nonlinear variable increase in pricing might reflect, for example, a sigmoid curve, the positive side of a parabola, etc., as illustrated by representative non-limiting examples in FIG. 9.

As yet another example of how increased pricing might parallel and impact increased consumption, the increased price might be reflected as a percentage of an "underlying cost" of the commodity. This would be particularly useful where the "underlying cost" of the commodity fluctuates for a variety of reasons. In the case of gasoline, the "underlying cost" can vary due to concern over impending war, refinery shutdowns, variation of production of petroleum in the Middle East, and so forth. In this variation, the invention would tie increased consumption in a predetermined time interval to an increasing percentage of the "underlying cost".

Continuing with the example of gasoline, instead of a fixed tax per unit volume of consumption per unit time, such as one dollar per unit volume per twenty unit volumes per week, the tax might be characterized as a percentage—e.g., 33%—of the base price for the first twenty unit volumes. With higher consumption, at some point, the tax might be, e.g., 66% of the base price of the next twenty unit volumes. Here, the variable pricing tracks dynamic pricing of the commodity. This way the tax will function to disincentivize demand at progressively higher levels of consumption. If the base price of the commodity fluctuated significantly, and the tax remained static, it would be very possible for the "underlying cost" to become very high and the tax relatively low. In that case, the tax, in it of itself, would have less influence on consumption. Although the high prices alone may diminish consumption, the goal of the invention is to reward "frugal" behavior and punish excess consumption. If the price per unit of commodity to all consumers is the same, all consumers are punished in the same way for consumption, whether their consumption rate is high or low. The invention allows for differential pricing that remains effective as a disincentive to excess consumption even when the price of the commodity varies, or, in and of itself, becomes high.

Implementation of the invention preferably includes keeping track of how much an individual purchases over a given period of time. Currently, purchases such as cigarettes and gasoline are not tracked for any one individual. The same tax is levied on a pack of cigarettes regardless of whether the purchaser purchases one pack per day or three packs per day. Also, one who drives a fuel-inefficient vehicle pays the same gasoline tax per unit volume as the person who drives a fuel-efficient hybrid vehicle. The burden on the purchaser bears the same proportion to the amount of consumption at all levels.

Increasing taxes does impact demand. It has been shown that increasing the tax on cigarettes does decrease the rate of smoking. And it has been shown that increasing the cost of gasoline does decrease demand. But, today, still too many people smoke. And the United States, as well as many other countries, are still net importers of petroleum, leaving such countries with vulnerable foreign policies. Such vulnerability would diminish if these countries approached the goal of energy independence. However, uniform taxation of a commodity fails to have a sufficient impact on consumption. The invention would transfer the burden of the cost onto individuals in a progressive way.

Keeping track of the purchases can be accomplished in one of several ways. First, a licensed individual might be issued a personal identification card that facilitates access to a central database. Every time the individual makes a purchase, the central database registers that that individual made a particular purchase at a particular time or within the licensed time interval. (See FIGS. 1 and 2, below.)

The individual may prepay the disincentive cost in advance. The prepayment might be only the cost of the disincentive itself (such as the tax). Or it might be the total of the disincentive cost plus the cost of the underlying commodity. In a prepaid embodiment, the system will preferably recognize from the central database each time a purchase is made that that individual has progressively fewer units, based on price, that can be consumed within the licensed time period. In the prepaid model, at some point the individual will run out of rights to purchase any additional commodities. (See FIGS. 3 and 4, below.) In one variation, the individual might be able to prepay again for rights to purchase the commodity within that time interval (if the previous prepaid allotment was exhausted), but he would preferably have to pre-pay at a higher rate, as a penalty for consuming more than predicted. Alternatively, additional purchases during the licensed time interval might be made at a higher "à la carte" rate; the individual would still be considered licensed to make purchases even though the prepayment has been consumed.

In another embodiment, a licensed individual again might be issued a personal identification card, but here after the issuance is recorded, the database preferably is not accessed further. In this model, all purchases of commodities are recorded on the card, and not in the central database. (See FIGS. 5 and 6, below.)

In this embodiment, the card may have a stored value, either in an electronic format or a mechanical format that leaves a visible mark (e.g., a punch card). The card, when purchased, could be recorded in the central database, tying the individual to the purchase of the card. But, neither the individual nor the card would interact further with the central database until the stored value in the card was exhausted. When the individual makes a purchase, the stored value diminishes, either by electronically decrementing the stored value or by some mechanical marking denoting that the card has less remaining value (denominated either in monetary units or in amounts of the commodity able to be purchased). This process occurs locally. When the card runs out of value, the individual can purchase a new card by interacting with the central system, and that transaction would be recorded in the database. If the licensed time period had not yet expired when the original card was consumed, the individual would likely have to purchase a new card at a higher rate, if allowed at all.

As an alternative to the prepaid embodiments, the license may simply be a license to purchase, with the tax rate to be imposed at the time of purchase. The system would record in the central database that the individual has made a purchase, and the price would calculated at (or immediately prior to) the time of purchase/consumption. Preferably, the calculation is made and displayed prior to a purchase so the consumer can make an informed decision as to whether or not to incur the cost of the purchase. In this version, the individual has not pre-paid for the commodity, or the disincentive cost (such as a tax) on the commodity. He has merely expressed a desire to be able to make purchases during the licensed period, on the understanding that the cost of each purchase will be calculated based on prior consumption during the licensed time interval. Here, at the point of sale, an input device I used to access the central system, which queries the database and compares the current purchase with the individual's prior consumption. A price is calculated taking into account the amount of prior consumption within the licensed time interval. It is conceivable that the individual might be foreclosed from even making a purchase if prior consumption has exceeded some pre-defined high level. Otherwise, the calculated total price is displayed as an output to the consumer, either at the time of purchase or the time of payment. Concurrently, the purchase might be completed using a method of payment such as a debit card, credit card, or other form of electronic funds transfer. Such funds might then be transferred electronically to vendor(s), the government, and/or other appropriate recipients of the funds, as discussed above.

In the embodiments which utilize a central database at the time commodities are purchased, the flow of information may be as follows:

An individual prepares to, or actually does, make a purchase. The individual, using an input device, accesses the database, directly (such as with by inserting license card or inputting identification information such as a PIN) or indirectly (such as with data inputted by the vendor), to signal the impending purchase. In the prepaid embodiment, the database will compare the individual's remaining rights to purchase the addictive commodity with the intended purchase amount. In either embodiment, if rights to purchase exist, the purchase can be completed, and the system records the purchase in the database. In the prepaid embodiment, the system also calculates and records the individual's remaining rights to purchase additional quantities of the addictive commodity within the licensed time interval. If at any time the individual has "run out" of rights to make an additional purchase, the system may notify the individual of the absence of such rights. The system might also signal how additional rights can be purchased, and indeed allow for purchase of such rights.

In the embodiment which uses a central database only for purchasing of the card (and not for the recording of individual purchases at the time of purchase), the flow of information may be as follows:

An individual purchases a card based generally on intended consumption within the time interval to be licensed and, in some cases, on prior consumption. The price is calculated based on one or both of those parameters and the system stores value(s) on the card. Stored value can represent economic value, such as a stored monetary amount. Or stored value might reflect only rights to purchase a certain maximum quantity. Each time the commodity is purchased, the purchase is recorded locally (generally on the card), and the stored value(s) on the card diminish. The individual does not need to interact with the central system until he desires to purchase a new card, either at the end of the licensed interval, or, if allowed, within the licensed time interval (where actual purchases exceeded planned purchases).

Thus, the invention is a useful system which provides rewards to an individual for low consumption of "addictive commodities," as well as imposing penalties on the individual for higher consumption of such "addictive commodities," based on tracking the purchases and/or consumption by that individual.

A more effective embodiment of the invention would provide strong feedback to the individual about the consequences of his purchasing decisions. Decisions which impact demand can be better made if the full cost of the incentive or penalty (including the aggregate costs of the disincentive fees) over some time interval were made more apparent to the individual. In this embodiment, the individual must prepay a sufficiently large amount of the disincentive cost, often reflecting rights to purchase over a reasonably long time period. For example, most smokers understand intellectually that they may be paying one dollar per pack, for example, in taxes. This amount seems reasonably small when measured pack-by-pack. Consequently, most people can find the money on a daily basis to make the purchase. For an addictive commodity, locating the dollar is no difficult task. Similarly, most motorists will grumble when gasoline increases from $2.00 per gallon to $3.00 per gallon. Yet, their purchasing decisions remain unchanged.

But if the smoker were made aware that he is paying $365 to $2,000 per year, and he had to prepay that large sum before being allowed to purchase cigarettes over the year, he might have much more incentive to stop. At least he would be able to better understand the full cost of purchasing over the year, for example, and compare it to other potential purchases, such as a high-definition television set, that could be made as a trade-off. Similarly, if a person had to prepay for gasoline, he would better understand how much his weekly purchases aggregated over time (per month or per quarter, for example) into a single number. In that context, based on the exposure to the large upfront cost, the driver might be more motivated to trade in a fuel-inefficient vehicle for a more fuel-efficient vehicle sooner rather than later.

An even more effective embodiment of the invention would allow for those who had prepaid a sufficiently large amount upfront to receive a positive incentive for trading in their license so that the remaining value could be applied in some form (likely, but not necessarily, discounted) for goods and services which promote decreased consumption. For example, if a smoker had prepaid for a year's supply of cigarettes at an intended rate of two packs per day, and he decided after a few months that he wanted to quit, he could trade in his license and might receive some credit which could be applied for smoking cessation products and/or services. The system would record in the central database that the license was turned in. The system might transmit this information about the potential credit and apply it for purchase of smoking cessation goods and/or services.

If the individual wanted to restart smoking, he would have to purchase a new license by again interacting with the central system. Disincentives could be in place such that if the individual traded in his license and received credits for smoking cessation products and/or services, the cost to purchase a new license after failing to stop smoking might be higher than it would otherwise have been. In this sense, the individual would be incentivized to persevere with the smoking-cessation program. Similar credits could be applied for those who own vehicles which consume a large amount of gasoline. If such an individual traded in his car for a more economical version, he might receive some type of credit, allowing him to trade his old license for a new license reflecting anticipated lower consumption. Again, the economic incentive would be to encourage behaviors which result in lower consumption of the targeted commodity.

In sum, then, invention is a system which will allow variable payment for "addictive" commodities, such as gasoline and cigarettes, based on the individual's intended consumption and/or actual consumption within a selected time interval. In accordance with the invention, individuals generally are charged higher rates for increased rates of consumption. This differs from typical economic models where volume is traditionally rewarded with a discount. With items such as cigarettes and gasoline, the goal of the invention is to more closely match the cost paid by the individual with the aggregate costs of such consumption paid by society. As a result, either consumption will diminish, or extra revenue will be generated which can be used in some way to offset the aggregate costs to society, or both.

By making the payments nonlinearly variable, there will be diminished likelihood of illegal trafficking in such commodities because a low level of consumption does not impose a significantly higher cost than the status quo. With cigarettes, for example, smoking one pack a day might impose a cost of $365, preferably paid up front for the year. The cost for a pack of cigarettes might then come down by $1, because the variable tax has been prepaid. Here, the full cost of the same tax is paid up front, but the yearly tax would be unchanged. If someone wanted to smoke two packs a day, he would have to pay a higher prepaid tax; in this model perhaps, $2 per pack, or $1,460 if prepaid for the year. There are many fewer two-pack-per-day smokers than one-pack-per-day smokers. To the extent that there would be an incentive to engage in illegal trafficking to avoid the tax, it should be limited to a much smaller cohort. Put a different way, if a state raised its cigarette tax from $1 a pack to $2 a pack for all smokers, there might many more smokers who would have an incentive to engage in illegal trafficking/purchasing. In the invention, the tax might remain stable, or even lower, for low consumption. This larger cohort would be properly incentivized to follow the rules.

Other features might be included in a method or system according to the invention to address additional concerns. A subset of people prefer privacy above almost all else. This cohort might be uncomfortable having their purchases recorded in a central database. Their position remains unfazed in spite of the fact that few smokers smoke only in private. And this is in spite of the fact that most people purchase gasoline with credit cards and their purchases are already recorded in a credit card database. Nonetheless, to address civil liberty concerns, at least one version of the invention might allow for opting out of the system. There, the individual could still purchase the commodity, but he would pay a higher or even the highest cost. The system as a whole works to disincentivize excess consumption only if the economic carrots and sticks are in place. Opting-out should be limited to those who place a far greater value on the privacy they are protecting than the cost of the commodity they are purchasing.

As a practical matter, above and beyond the issue of privacy, if the system is run by the state, not all states will necessarily implement a uniform system. People travel from one state to another, and their desire or need to consume addictive compounds could still be present even if they are traveling in another state. A system might allow some type of reciprocity whereby the individual would be able to make a purchase, as if the purchase were being made in his home state. The system would make a determination, based on pre-existing rules, as to who would receive the tax revenue, as between the state where the purchase was made, or the "home" state, or even a federal entity. As an alternative, the individual from another state might be treated like the person who opts out, and be charged a high or even the highest rate at the time of purchase. Such a high or even the highest rate imposes a significant disincentive cost. As an alternative, the system might accommodate out-of-state individuals, with proof of identification, by exempting them from the disincentive structure (as such individuals are less likely to impose long term excessive costs on that state or on residents of that state).

Finally, there are some commodities that are currently illegal, but conceivably could be decriminalized in the future. In fact, some of these commodities are already decriminalized in some jurisdictions. The concern that policy makers have with an across the board decriminalization is that it could lead to the "slippery slope," with the least harmful substances, such as marijuana, acting as a gateway to other drugs. Or, some individuals could start off with minimal consumption, and ultimately succumb to more frequent consumption. The reality is that some individuals are more prone to abuse of such substances than others. This is the case with alcohol, and it presumably is the case with more addictive compounds. Put a different way, not all compounds have the same effects on all people. In fact, it is quite conceivable that some people will engage in entirely responsible use, minimizing or avoiding harm to themselves or others. Certainly society accepts that premise for alcohol. The invention could be used to allow for a low payment for minimal consumption with progressively higher payments for higher levels of consumption of such substances.

Further, at some point, the system might trigger a fail-safe mechanism, whereby an individual, based on frequency of consumption, might be identified as a person who is at risk of crossing over to irresponsible use. That individual might be targeted (perhaps as part of a voluntary program) for early intervention to prevent harm. The invention would allow for rational introduction of currently decriminalized substances, or substances which may be decriminalized, on a larger scale with less risk. The goal of the invention in such a system would be to promote responsible and limited consumption, while identifying those at risk for abuse. The system would have the advantage of avoiding penalizing the entire population because of the actions of an irresponsible few.

Also, there are embodiments of the invention that could be implemented to make it more user friendly based on specific circumstances. The system primarily addresses an individual's right to consume a commodity. There are circumstances, where it would make more sense to allow for aggregate purchases by units other than individuals. For example, a husband and wife might share two vehicles. There, it might make sense for public policy reasons to treat the husband and the wife as a unit of two people, so that they would not collectively be penalized excessively. As a separate example, a business might purchase a quantity of a commodity for the entire organization. There, it would make more sense for the organization to be addressed as a whole, as opposed to individual employees. Hence, the system can accommodate a broader definition of "individuals" in defining how the system is accessed to achieve policy goals.

FIG. 1 is a schematic diagram showing a prospective payment system 100, tied to one or more central databases. The consuming entity 102 is ordinarily an individual who wishes to purchase some amount of an "addictive" commodity within a specific time interval. He must purchase or be given a license 106 giving him rights to do so. The ownership of the license by a particular individual (or entity) is stored in a central database 104. To make a purchase of an addictive commodity, the consuming entity 102 interacts with a vendor 108 of the addictive commodity. An input/output device 110 is made available directly or indirectly by the vendor 108, or is accessible by a device the consuming entity 102 possesses, leases, and/or uses.

The device 110 queries a central database 112 to determine if the consuming entity 102 has rights to make the purchase. If so, the central database 112 calculates the price (the price being based on an increasing cost to disincentivize increasing consumption of an addictive commodity within a specific time interval). The database 112 records the purchase, and preferably transfers information to another database 104 which keeps a record of purchases by the consuming entity 102 over time so as to determine eligibility and/or cost for purchasing a new license in the future. Optionally, a system 114 can allow transfer of funds, directly or indirectly, from the consuming entity to the vendor 108, and/or the recipient of the disincentive cost 116 (in the case of a tax, the government). The system for transferring funds preferably enables the transfer and records the transfer in another database (within system 114). Central database 104, and central database 112, and/or the database within system 114, might represent different fields within the same or a common database.

Figure 2:
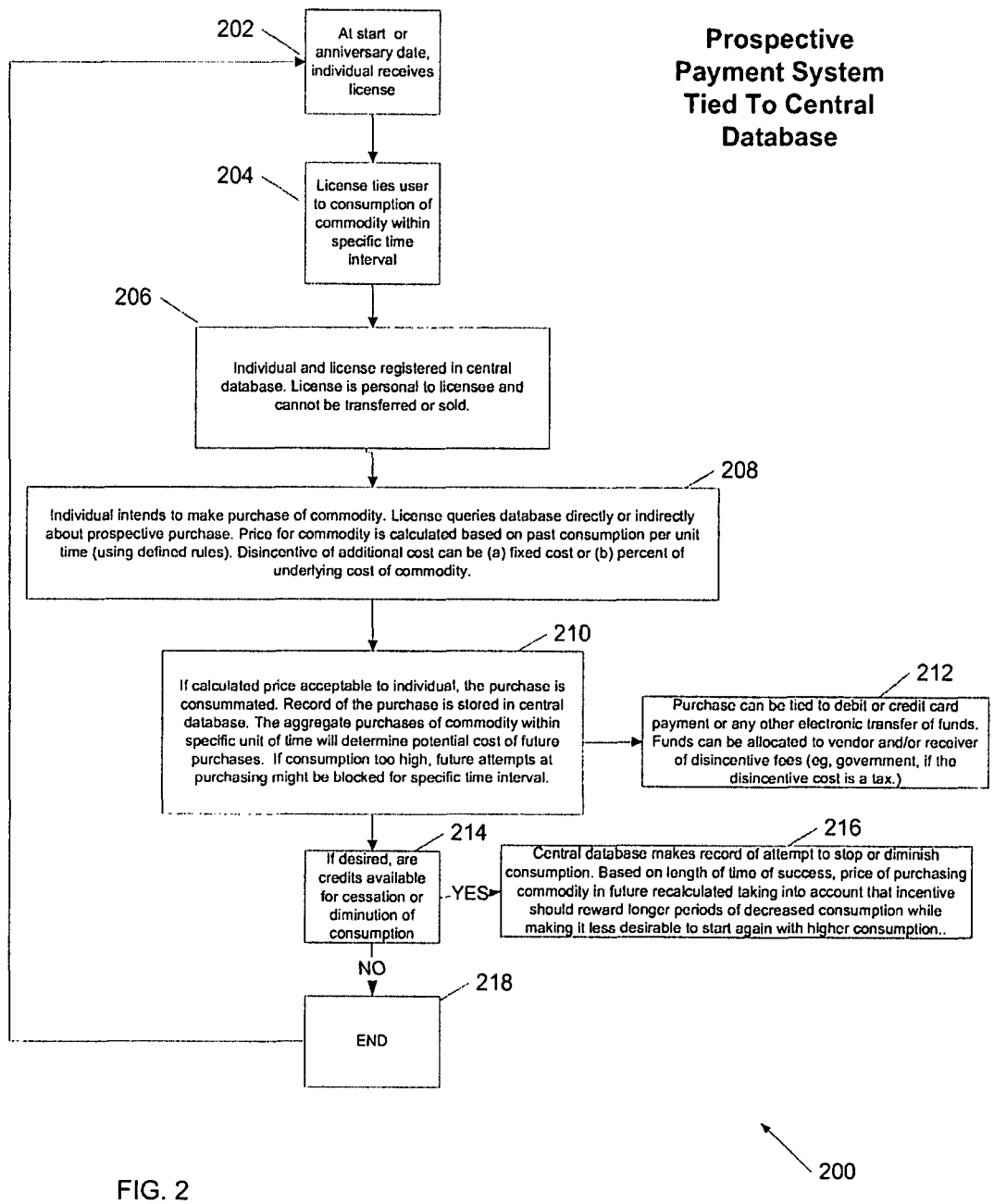
FIG. 2 is a flow diagram of a method according to an embodiment of the invention.

FIG. 2 is a flow diagram of a method 200 according to an embodiment of the invention. At step 202, generally at the start or at the anniversary date, a consuming entity, often an individual, receives a license, which may be in the form of a card. As described in step 204, the license associates the individual to the right to be able to purchase and/or consume a specific quantity of an addictive commodity within a predetermined time interval. The individual and the license representing the individual's rights to purchase and/or consume such commodity within the predetermined time interval are recorded at step 206 in a central database. The license preferably is personal to the licensee and cannot be transferred, used by another, assigned, or sold. It is intended to have no value to anyone other than the licensee.

If and when the licensee intends to purchase the specific addictive commodity, at step 208 he contacts a vendor. The license is used to enable the transaction. The license is used directly or indirectly to query the database about making the prospective purchase. If rights are available, the database calculates the cost for the purchase based on a formula which takes into account past purchasing or consumption by the individual within a specific time interval. In general, the calculation imposes a disincentive cost which is related to past consumption; the disincentive cost becoming progressively higher with additional purchasing or consumption within a specific time interval. (If the calculation determines that the prospective purchase or consumption will be higher than allowed by the rules, the right to purchase might even be foreclosed.) The disincentive cost can be a fixed amount per purchase or unit of consumption. Alternatively, the disincentive cost might be a percentage of the "underlying cost" of the addictive commodity.

At step 210, the calculated price is generally, but not necessarily, displayed to the individual. The purchase is completed. A record of the transaction is stored in a central database. Aggregate purchases or consumption within a specific time interval will be recorded in the central database so as to be used to calculate the cost of potential future purchases. Again, if a future prospective purchase or consumption would be in excess of that which is permitted by the rules, the transaction might be blocked for a specific time interval.

Optionally, at step 212, payment for the purchase can be completed by debit card, credit card, or other type of electronic transfer of funds. And the transfer of funds can be allocated to the vendor and/or the recipient of the disincentive cost (e.g., in the case of a tax, to the government).

Optionally, at step 214, credits might be available if the individual wants to stop or curtail future consumption. The credits might be available to purchase or provide products and/or services to assist with decreasing consumption of the addictive commodity. At step 216, the central database would make a record of the intent to decrease or stop future purchases or consumption. Based on length of time of success, the price of purchasing the addictive commodity in future might be recalculated taking into account that the incentive should reward longer periods of decreased consumption while making it less desirable to start again with higher consumption. The method ends at 218 unless the individual needs to renew the license at an anniversary date to access future rights, in which case the method restarts at step 202.

Figure 3:
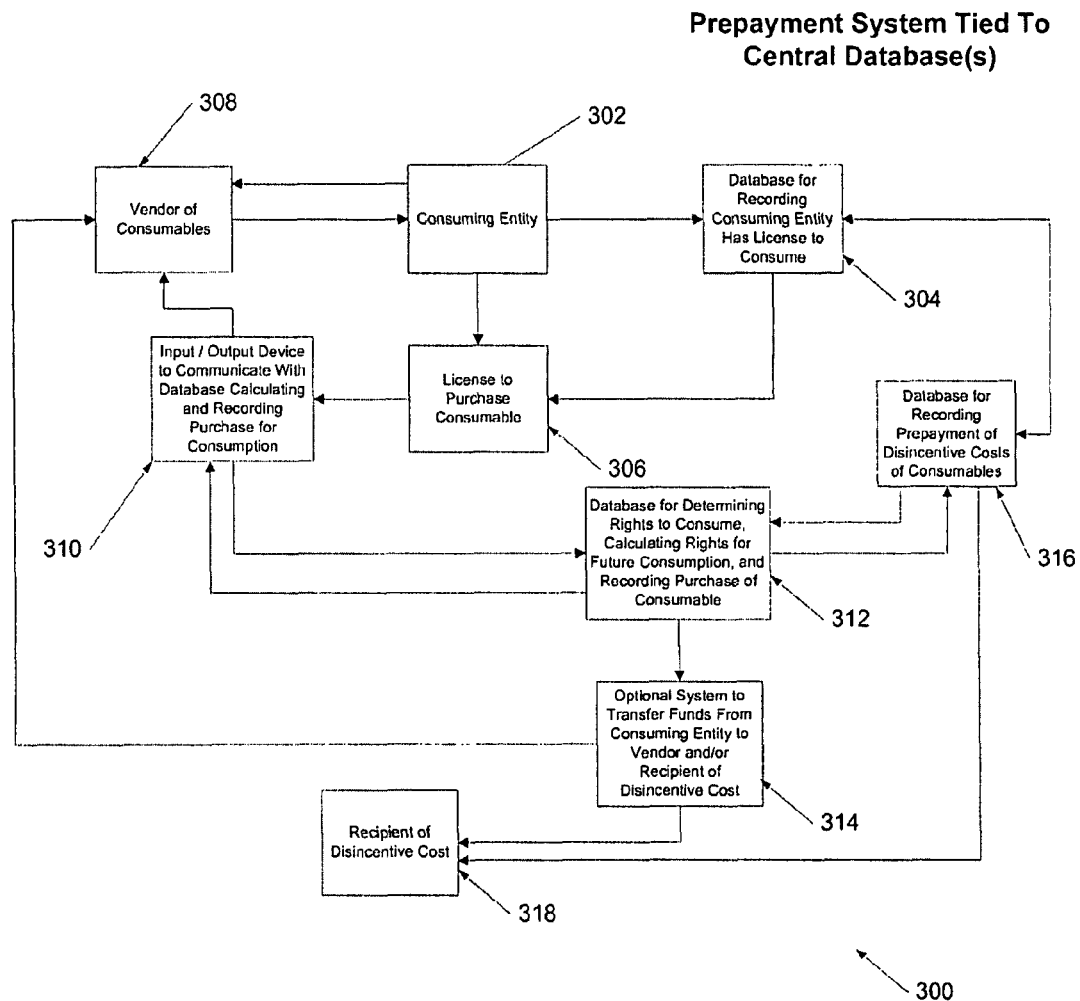
FIG. 3 is a schematic diagram showing a pre-payment system tied to central database(s)

FIG. 3 is a schematic diagram showing a pre-payment system 300 tied to central database(s). The consuming entity 302 is ordinarily an individual who wishes to purchase some amount of an "addictive" commodity within a specific time interval. He must purchase or be given a license 306 giving him rights to do so. The ownership of the license by a particular individual (or entity) is stored in a central database 304. The individual 302 prepays for the addictive commodity, either in part, or in full, and this prepayment is recorded in a database 316. At least one of the components of the prepayment is a disincentive cost, such as a tax on the addictive commodity. The amount of the prepayment preferably is a nonlinearly increasing cost to disincentivize increasing consumption of an addictive commodity within the licensed time interval.

To make a purchase of an addictive commodity, the consuming entity 302 interacts with a vendor 308 of the addictive commodity. An input/output device 310 is made available directly or indirectly by the vendor 308, or accessible by a device the consuming entity 302 possesses, leases, and/or uses. The device 310 queries a central database 312 to determine if the consuming entity 302 has rights to make the purchase. Central database 312 accesses information in central databases 304 and 316 to determine eligibility.

If the purchaser is eligible, the central database 312 enables the purchase, allocating all or part of the prepayment to the purchase. Central database 312 records the purchase, and calculates and records future remaining rights to make additional purchases in a specific time interval. The calculated purchase amount preferably is debited from the prepayment, leaving a smaller cash value available to be allocated to future purchases, or, more generally, allowing fewer units of the commodity to be purchased during the remainder of the licensed time interval. Remaining rights might be displayed as output on device 310 to inform the consuming entity 302. The consummated transaction preferably is also stored in or accessed by database 316, so that the purchase can be tied to the prepayment. Further, such information can stored or accessed by database 304 which preferably determines the ability of the consuming entity 302 to purchase additional rights (and/or a new license) when the current license expires or the prepayment for the licensed time interval is exhausted.

Optionally, a system 314 can allow transfer of funds, directly or indirectly, from the consuming entity to the vendor 308 and/or the recipient of the disincentive cost 318 (e.g., in the case of a tax, to the government). The prepaid disincentive cost can be transferred to the recipient (of the disincentive cost) at any time between initial prepayment by consuming entity 302 and purchase from vendor 308, or even after. Likewise, some or all of the prepayment, if also comprising the "underlying cost" of the commodity, can be transferred directly or indirectly to vendor 308 at the time of or after the purchase from vendor 308. Finally, if prepayment only includes the disincentive cost of the commodity, system 314 can enable transfer of other funds at the time of purchase from consuming entity 302 to vendor 308, directly or indirectly.

The system for transferring funds preferably would enable the transfer and record the transfer in another database (within system 314). In addition, the database within system 314 might inform or allow access of the recorded transfer of funds in databases 304, 312, and/or 316. Central database 304, central database 312, central database 316, and/or the database within system 314, might represent different fields within the same or a common database.

Figure 4:
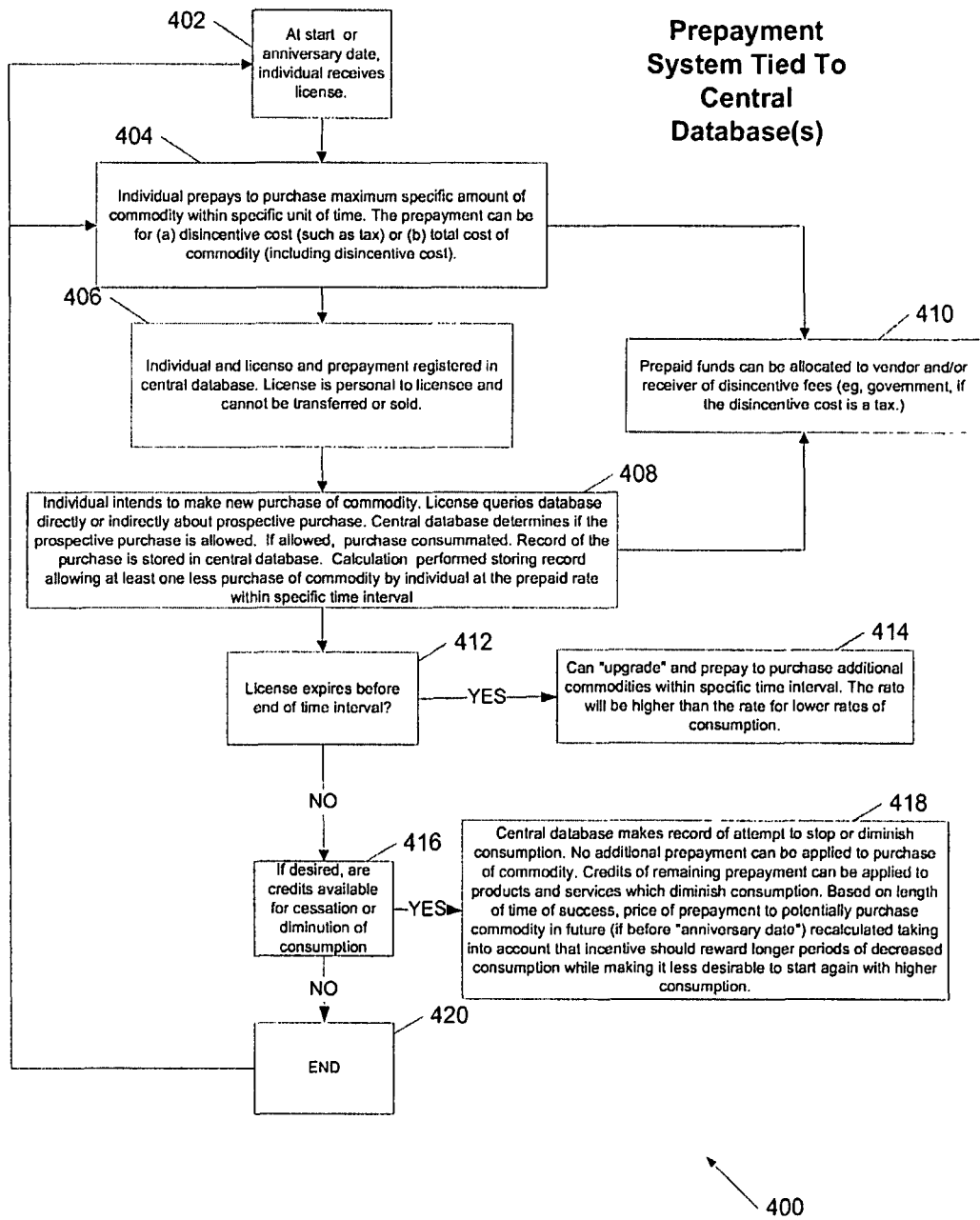
FIG. 4 is a flow diagram of a method according to another embodiment of the invention.

FIG. 4 is a flow diagram of a method 400 according to a prepaid embodiment of the invention. At step 402, generally the start or at anniversary date, a consuming entity, often an individual, receives a license. As described in step 404, the license gives the individual the right to be able to purchase and/or consume a specified maximum quantity of an addictive commodity within a particular time interval. Also, in step 404, the individual prepays a sum for the rights associated with the license. The prepayment includes at least a disincentive cost which preferably becomes progressively higher, preferably nonlinearly, with intended higher amounts of purchasing of the addictive commodity within the licensed time interval. The prepayment can alternatively address some or all of the total cost of the commodity (including the disincentive cost). The individual, the license, and the prepayment representing the individual's personal rights to purchase and/or consume such a commodity within the licensed time interval are all recorded at step 406 in a central database. The license preferably is personal to the licensee and cannot be transferred, used by another, assigned, or sold. It is intended to have no value to anyone other than the licensee.

If and when the licensee intends to purchase the specific addictive commodity, at step 408 he contacts a vendor. The prepaid license is used to enable the transaction. The license is used directly or indirectly to query the database about making the prospective purchase. The database makes a determination whether rights remain to make the prospective purchase. If rights are available, the database may allow the purchase, decreasing the remaining number of potential future purchases within a specific time interval by at least one, the total remaining number of purchases being determined by the initial prepayment. Future rights allowed within the licensed time interval are stored within the database.

Optionally, at step 410, the purchase can enable prepaid funds to be allocated to the vendor and/or the recipient of the disincentive cost (e.g., if the disincentive cost is a tax, to the government). Alternatively, funds could be allocated to the recipient of the disincentive cost (e.g., if the disincentive cost is a tax, to the government) just after step 404. Alternatively, funds could be allocated to the recipient of the disincentive cost at any time after prepayment is made; including, uncommonly, long after purchase at step 408 is made.

At step 412, if the license expires (generally meaning that the prepayment to allow for future purchases has been exhausted) before the licensed time interval has ended, if future rights to make additional purchases can be obtained, at step 414 the individual prepays to do so. The additional prepayment allows for the purchase of yet additional addictive commodities in the remaining time interval. Generally, the prepayment cost may be higher than before, so as to disincentivize higher levels of consumption.

If the license has not expired, at step 416 the individual makes a decision as to whether or not to stop or diminish consumption. He might inquire about credits related to remaining value of the prepayment. If available, the central database, at step 418, makes a record of an attempt to stop or diminish consumption. In that case, no additional prepayment can be applied to purchase of the commodity. Credits of remaining prepayment may be applied to products and services intended to diminish consumption. Based on length of time of success, the price of prepayment to potentially purchase the addictive commodity in the future (if before the "anniversary date") might be recalculated taking into account that the incentive should reward longer periods of decreased consumption while making it less desirable to start again with even higher consumption. If there is no attempt to stop or diminish consumption, the method ends at step 420, pending the next purchase. The method can restart at the anniversary date at step 402 if the individual needs to receive a new license. Alternatively, if the license itself remains valid, the method can restart at the anniversary date at step 404 if the individual only needs to make new prepayment for a new licensed time interval.

Figure 5:
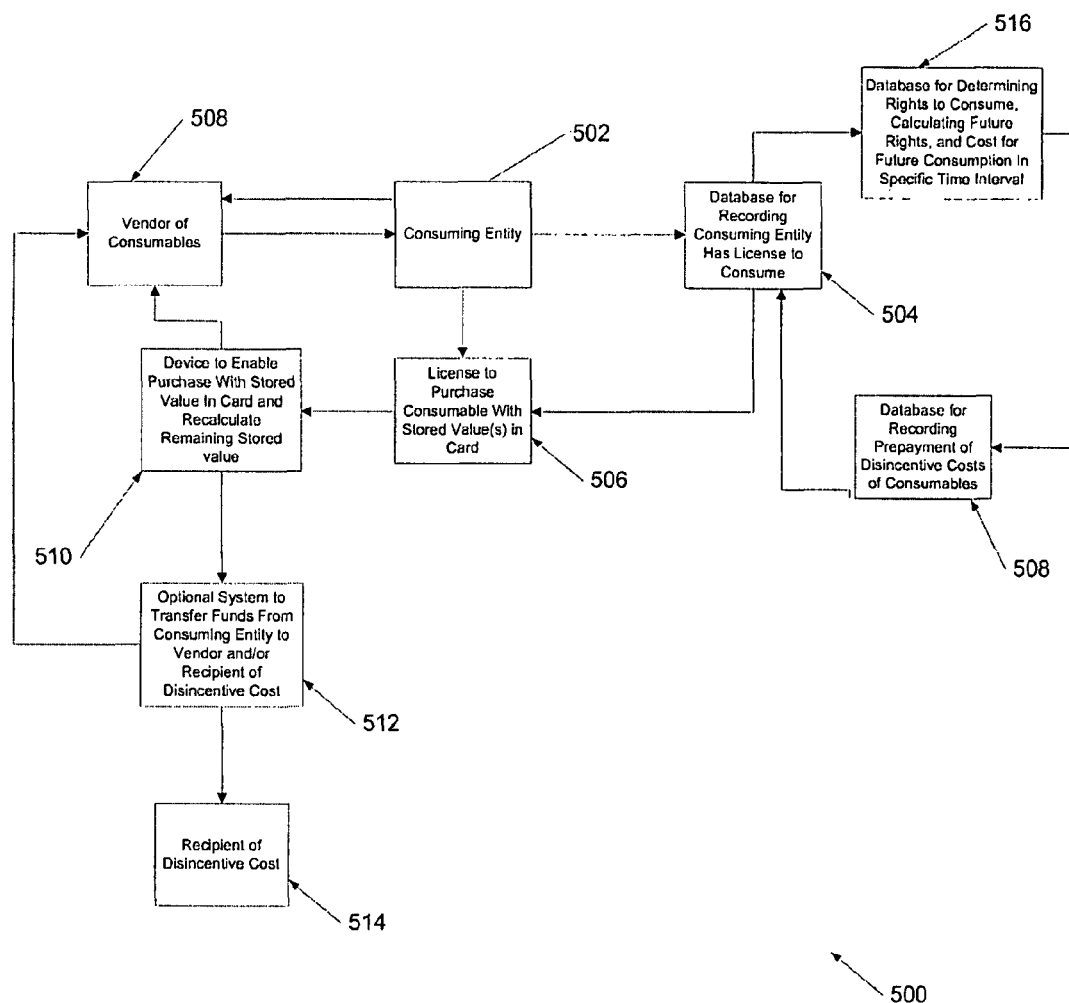
FIG. 5 is a schematic diagram showing a pre-payment system tied to stored value(s) in a card.

FIG. 5 is a schematic diagram showing a pre-payment system 500 tied to stored value(s) on a card. The consuming entity 502 is ordinarily an individual who wishes to purchase some amount of an addictive commodity within a specific time interval. He must purchase or be given a license 506, granting him rights to do so. The ownership of the license by a particular individual (or entity) is stored in a central database 504. The individual 502 prepays for the addictive commodity, either in part, or in full, and this prepayment is recorded in a database 508. At least one of the components of the prepayment is a disincentive cost, such as a tax on the addictive commodity. The amount of the prepayment is determined by a nonlinearly increasing cost to disincentivize increasing consumption of an addictive commodity within the licensed time interval. The value of the prepayment can be stored on the card 506 itself. Or the right to make unit purchases in the licensed time interval can be stored as a value on the card 506. The ability of the consuming entity 502 to purchase additional rights (and/or a new card) when the value on the current card is exhausted is addressed by database 516. Central database 504, central database 508, and/or central database 516, ordinarily would transfer information back and forth and might represent different fields within the same or a common database.

To make a purchase of an addictive commodity, the consuming entity 502 interacts with a vendor 508 of the addictive commodity. A local device 510 is made available directly or indirectly by the vendor 508, or accessible by a device the consuming entity 502 possesses, leases, and/or uses. The device 510 reads the remaining value(s) stored on card 506 to determine if the consuming entity 502 has rights or remaining prepayment funds to make the purchase. If the remaining stored value allows the purchase, the purchase is consummated, and the remaining value(s) stored on the card are recalculated by device 510 to allow at least one less purchase by the card 506 within the licensed time interval. Device 510 may also display as output any remaining stored value(s) on card 506 to inform the consuming entity 502.

Optionally, a system 512 can allow transfer of funds, directly or indirectly, from the consuming entity to the vendor 508 and/or the recipient of the disincentive cost 514 (e.g., in the case of a tax, to the government). The prepaid disincentive cost can be transferred to the recipient (of the disincentive cost) at any time between initial prepayment by consuming entity 502 and purchase from vendor 508, or even after. Likewise, prepayment, if also comprising the "underlying cost" of the commodity, can be transferred directly or indirectly to vendor 508 at any time between initial prepayment by consuming entity 502 and purchase from vendor 508, or even after. Finally, if the prepayment includes only the disincentive cost of the commodity, system 512 can enable transfer of other funds at or near the time of purchase from consuming entity 502 to vendor 508, directly or indirectly.

Figure 6:
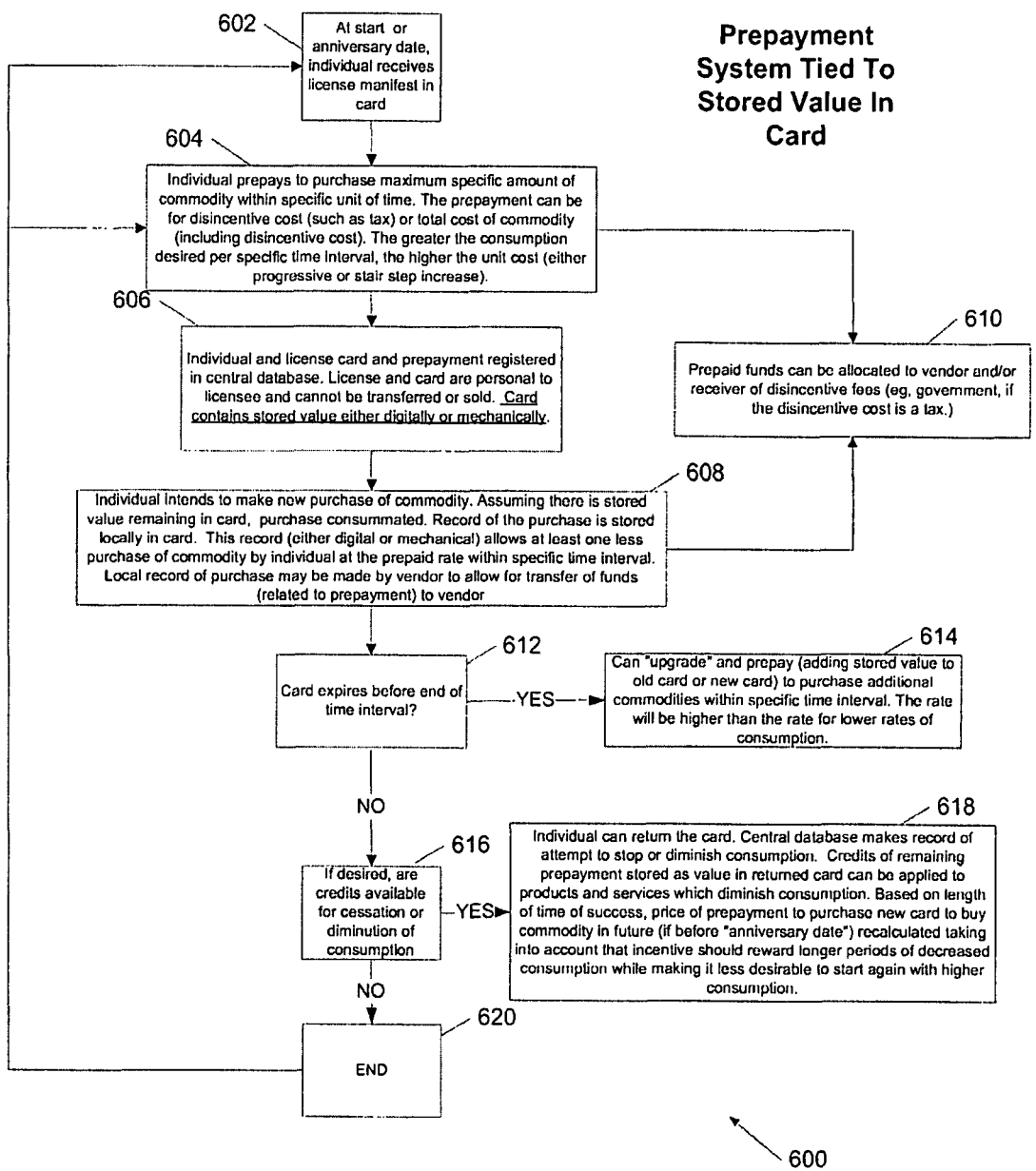
FIG. 6 is a flow diagram of a method according to another embodiment of the invention.

FIG. 6 is a flow diagram of a method 600 according to another stored value card embodiment of the invention. At step 602, generally the start or at anniversary date, a consuming entity, often an individual, receives a license. In step 604, the license grants to the individual the right to be able to purchase and/or consume a specific quantity of an addictive commodity within a licensed time interval. To accomplish this, also at step 604, the individual prepays to purchase a maximum specific amount of the commodity within the licensed time interval. The prepayment can be for the disincentive cost (such as tax) or total cost of the commodity (including disincentive cost). The greater the consumption desired for the licensed time interval, the higher the unit cost (either progressive or stair-step increase or any other number of variations). The individual, the license, and the prepayment representing the individual's personal rights to purchase and/or consume such commodity within the licensed time interval are recorded at step 606 in a central database. The license preferably is personal to the licensee and cannot be transferred, use by another, assigned, or sold. It is intended to have no value to anyone other than the licensee. After prepayment the license card preferably contains stored value(s) which enables prospective purchases, which could be either a stored cash value or a method of conveying that the individual has rights to purchase.

At step 608, the individual attempts to make a new purchase of a commodity. Assuming there is stored value remaining on the license card, the purchase can be consummated. Record of the purchase is stored locally on the card. This record (either digital or mechanical) allows at least one less purchase of the commodity by the individual at the prepaid rate during the remainder of the licensed time interval. Optionally, at step 610, a local record of purchase may also be made by vendor to allow for transfer of funds (related to prepayment), electronic or otherwise, to the vendor. The local record of the purchase can also be allocated to the recipient of the disincentive cost (e.g., if the disincentive cost is a tax, to the government). Alternatively, funds could be allocated to the recipient of the disincentive cost (e.g., if the disincentive cost is a tax, to the government) just after step 604. Alternatively, funds could be allocated to the recipient of the disincentive cost at any time after prepayment is made; including an uncommonly long time after the purchase at step 608 is made.

At step 612, if the card expires (generally meaning that the prepayment to allow for future purchases has been exhausted) before the licensed time interval has ended, if future rights to make additional purchases can be bought, at step 614, the individual prepays to do so. The additional prepayment allows for the purchase of yet additional addictive commodities during the remainder of the licensed time interval and requires either refreshing the old card with stored value(s), or providing a new card with stored value(s). Generally, the prepayment cost will be higher than before, so as to disincentivize higher levels of consumption. If the card has not expired, at step 616, the individual makes a decision as to whether or not to stop or diminish consumption. He might inquire about credits related to remaining value of prepayment. If such credits are available, the central database, at step 618, makes a record of an attempt to stop or diminish consumption. No additional prepayment can be applied to further purchase of commodity. Credits of remaining prepayment may be applied to products and services which diminish consumption. Based on the length of time of success, the price of prepayment to potentially purchase the addictive commodity in future (if before the "anniversary date") might be recalculated taking into account that the incentive should reward longer periods of decreased consumption while making it less desirable to start again with even higher consumption. If there is no inquiry into stopping or diminishing consumption, the method ends at step 620, pending the next purchase. If renewal is desired, the method restarts at the anniversary date at step 602 if the individual needs to receive a new license. Alternatively, if the license remains valid, again if renewal is desired, the method restarts at the anniversary date at step 604 if the individual only needs to make new prepayment to refresh stored value(s) in the old card or to purchase a new card with stored value(s). The new card will allow for prospective purchase of a maximum specific amount of addictive commodity for yet another specified licensed time interval.

Figure 7:
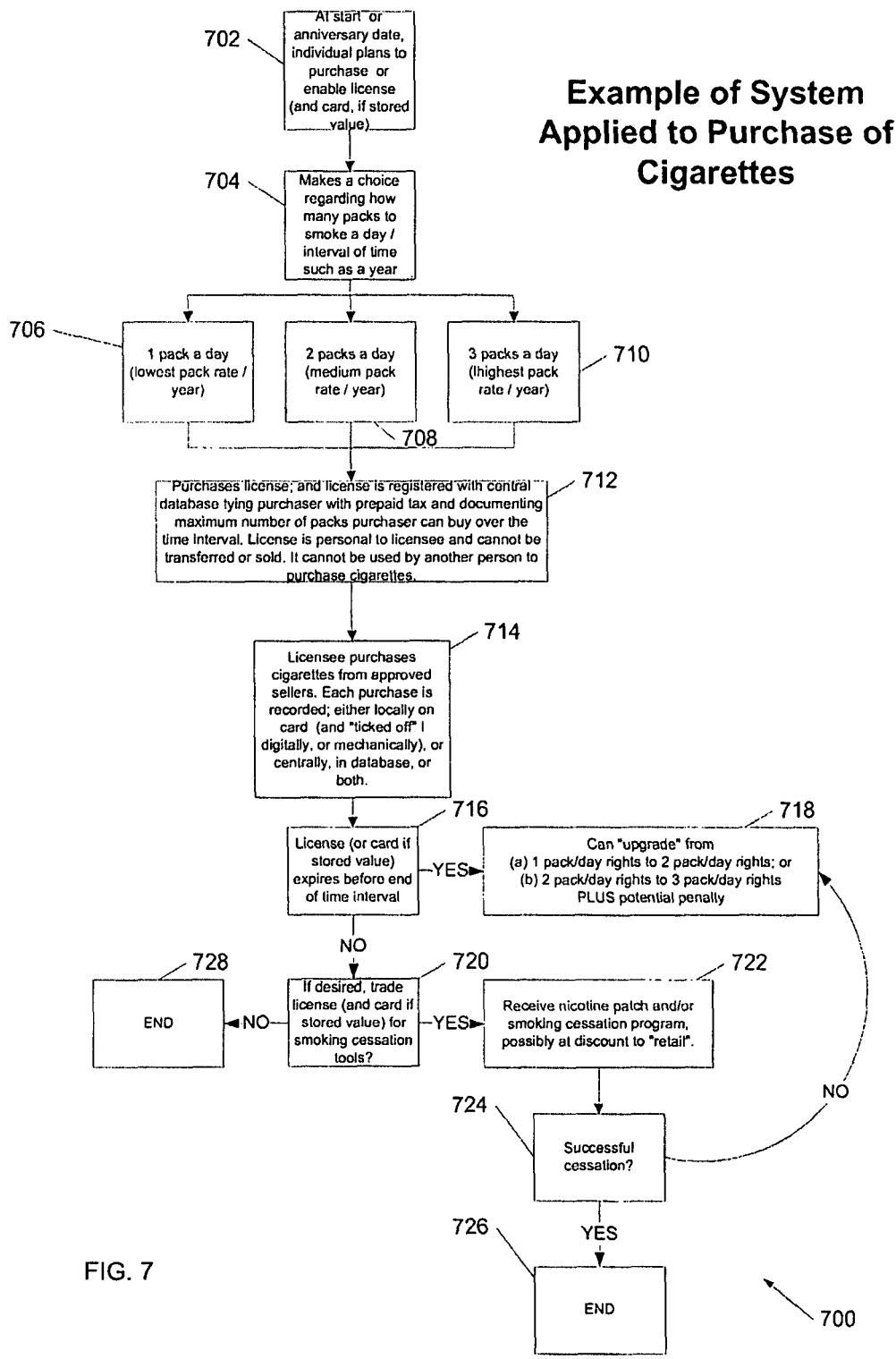
FIG. 7 is a flow diagram of method(s) using the invention to disincentivize the purchase of smoking products.

FIG. 7 is a flow diagram of illustrative method(s) 700 using the invention specifically to disincentivize the purchase of smoking products. At the start or at the anniversary date in step 702, an individual plans to purchase a license card to allow him the right to purchase a maximum amount of cigarettes in a particular time interval. At step 704, the individual determines just how many packs of cigarettes he likely intends to smoke in a given time interval—in this case, a year. He will prepay the aggregate yearly tax on the intended purchases based on his decision. In step 706, he might commit to purchasing one pack per day for a year. There, he would have the lowest tax rate per pack per year. Alternatively, in step 708, he might commit to purchasing two packs per day for a year. There, he would have a mid-level tax rate per pack per year. Or alternatively, in step 710, he might commit to purchasing three packs per day for a year. There, he would have the highest tax rate per pack per year. At step 712, the prepayment having been accomplished, the individual would receive a license which is registered with a central database tying the purchaser with the prepaid tax and documenting the maximum number of packs the purchaser can buy over the licensed time interval. The license preferably is personal to the licensee and cannot be transferred, used by another, assigned, or sold. It is intended to have no value to anyone other than the licensee.

At step 714, the licensee purchases cigarettes within the specified time period from approved vendors. Each purchase is recorded; either locally on the license (and "ticked off" either digitally, or mechanically), or centrally, in a database, or both. Every time a purchase is made, the individual can purchase at least one less pack of cigarettes within the specific time interval, until the value in the card is exhausted. In this example, the specific time interval is one year. The license might have stored monetary value which can be used to pay the vendor. Or the license might just store information representing rights to purchase. In addition, the purchase can be used to trigger payment of funds to the vendor and/or the government (if the government had not been paid for the tax after the initial prepayment was made.) The payment can be from monetary value stored in the card itself or from use of the card to trigger electronic transfer of funds.

At step 716, the system tests whether the value on the card has been exhausted before the licensed time interval has elapsed. In this example, the question is whether the individual has purchased his maximum yearly allocation of cigarettes before the year has ended. If so, and if he wishes to have the right to purchase additional packs of cigarettes before the licensed interval has ended, at step 718, if allowed, the individual can "upgrade" and purchase additional rights. He can "upgrade" from the average one pack per day license to the average two pack per day license. Alternatively, he can "upgrade" from the average two pack per day license to the average three pack per day license. There may be an additional cost for the "upgrade", in that the individual does not simply buy another license at the same rate, as though he were starting at the beginning of the year. Instead, he must pay for the difference between what he would have paid had he bought a license for the new total amount in the first instance, and what he actually paid for the original smaller amount, so that he pays the higher per-pack rate even for the cigarettes consumed under his original smaller license. In another version, the model imposes a further penalty for the upgrade to provide yet additional disincentives to keep smoking, at least at such a heavy rate. The penalty might be in the form of an even higher per-pack rate than if the individual had purchased a license for that many packs in the first instance, or it could simply be a flat fee for not choosing the correct amount in the first instance.

At step 716, if the license has not expired, and there are still rights to purchase additional packs of cigarettes, the individual can, at step 720, inquire as to whether there are credits available related to stopping smoking or diminishing amount of smoking. If such credits are available, at step 722, remaining stored value might be used to assist with purchase or provision of smoking cessation products and/or services. In one embodiment, such credits might purchase more goods and services than would be available at the retail price, with the goal of creating an incentive to stop smoking. Alternatively, some of the credit can be applied as cash value back to the individual. If cessation is successful at step 724, the method ends at step 726. If cessation is not successful at step 724, the individual can return to step 718 and "upgrade" to a card that will allow continued purchase of cigarettes within the licensed time interval. There might be a penalty cost associated with restarting smoking. Again, the model may impose an additional cost for the "upgrade" to provide yet additional disincentives to keep smoking, at least at such a heavy rate.

If there are no credits available for smoking cessation (or diminution of frequency of smoking) at step 720, the method stops at step 728.

Figure 8:
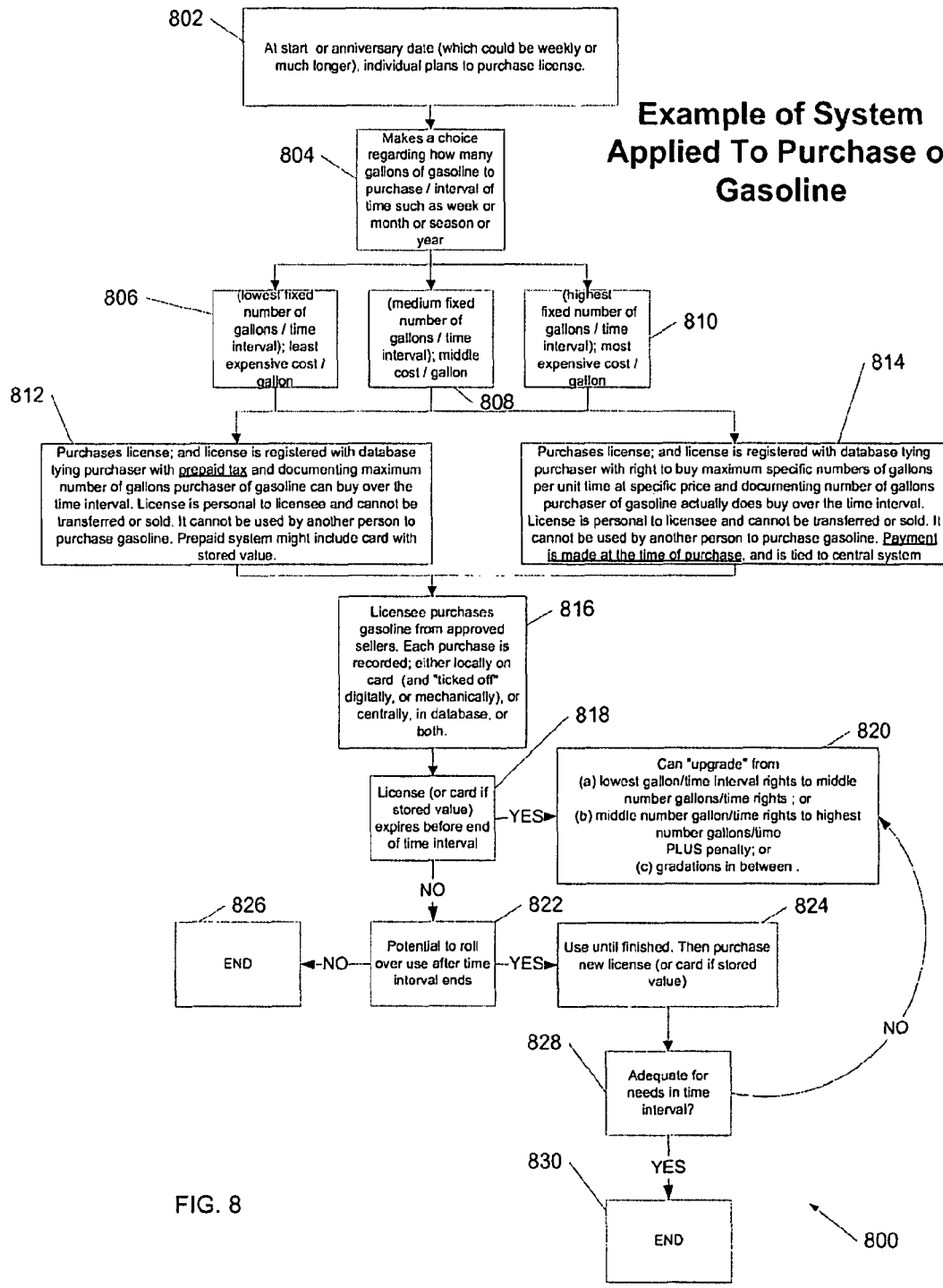
FIG. 8 is a flow diagram of method(s) using the invention to disincentivize the purchase of gasoline-containing products.

FIG. 8 is a flow diagram of method(s) 800 using the invention to disincentivize the purchase of gasoline-containing products. At the start or at the anniversary date in step 802, an individual plans to purchase a license to allow him the right to purchase a predetermined maximum amount of gasoline in a licensed time interval. The time interval will vary based on the system used. It could be as short as a week and as long as a year or any interval in between or longer.

At step 804, the individual determines just how many unit volumes (e.g., gallons or liters) of gasoline-containing products he is likely to purchase in the given time interval. In illustrative steps 806, 808, and 810, the decision on how many unit volumes he is likely to purchase within the licensed time interval will determine his cost per unit volume per time period. The disincentive of extra cost becomes progressively higher nonlinearly with additional purchasing or consumption within the licensed time interval. In the case of gasoline, because the cost fluctuates quite a bit due to many circumstances, the disincentive cost will likely be a set of fixed percentage of the "underlying cost" of the gasoline. For the lowest consumption of gasoline in a licensed time interval as noted in step 806, the disincentive cost will be the lowest fixed percentage of the "underlying cost" of the gasoline. For the highest consumption of gasoline in a licensed time interval as noted in step 810, the disincentive cost will be the highest fixed percentage of the "underlying cost" of the gasoline. For a middle range of consumption of gasoline in a licensed time interval as noted in step 808, the disincentive cost will be the a middle range fixed percentage of the "underlying cost" of the gasoline. Alternatively, instead of the amounts in steps 806, 808, or 810 being a fixed percentage of the "underlying cost" of the gasoline, they could be fixed numbers, again with the lowest amount of consumption being associated with the lowest fixed disincentive cost per unit volume, the highest amount of consumption being associated with the highest fixed disincentive cost per unit volume, and a middle amount of consumption being associated with the middle-range fixed disincentive cost per unit volume.

In step 812 the individual purchases a license and the license is registered in a database tying the purchaser to prepaid tax and documenting the maximum number of unit volumes the purchaser of gasoline can buy over the licensed time interval. He will prepay the aggregate tax for the licensed time interval on the intended purchases based on his decision. The license preferably is personal to the licensee and cannot be transferred, used by another, assigned, or sold. It is intended to have no value to anyone other than the licensee. It is not intended to be used by another person to purchase gasoline although the system might accommodate a broad definition of who a licensee is for public policy reasons. For example, a husband and wife, or a family, might be considered a single licensee. Or a corporation might have aggregate privileges and be considered a single licensee. The more unit volumes one wanted to purchase within the licensed time interval, the larger the tax would be per unit volume. Such calculations might reflect a stair-step increase in the tax per unit volume. Or it might represent a "smoother curve", with some formula or table determining the progressive increase in tax per unit volume based on total number of unit volumes intended to be purchased during the licensed time interval.

Alternatively to step 812, at step 814, the individual will purchase the license and the license is registered in a database tying the purchaser with rights to buy specific numbers of unit volumes per unit time at a specific price and/or tax rate per unit volume. In addition, the database would document the number of unit volumes the licensee actually does buy over the time interval. The license preferably is personal to the licensee and cannot be transferred, used by another, assigned, or sold. It is intended to have no value to anyone other than the licensee. It is not intended to be used by another person to purchase gasoline although the system might accommodate a broad definition of who a licensee is for public policy reasons. For example, a husband and wife, or a family might be considered a single licensee. Or a corporation might have aggregate privileges and be considered a single licensee. The more unit volumes one actually purchased within the licensed time interval, the larger the tax would be per unit time interval. Such calculations might reflect a stair-step increase in the tax per unit volume. Or it might represent a "smoother curve," with some formula or table determining the progressive increase in tax per unit volume based on total number of unit volumes actually purchased in a licensed time interval. Payment preferably is made at the time of purchase, and is recorded in a central system. A difference between step 812 and 814 is that in step 812, the system (and the disincentive cost such as tax) is based on prepayment of anticipated maximum use. In step 814, the system calculates actual usage within the licensed time interval and recalculates the disincentive cost per unit volume based on past usage within the licensed time interval.

At step 816, the licensee purchases gasoline within the licensed time period from approved vendors. Each purchase is recorded either locally on the license card (and "ticked off" either digitally, or mechanically), or centrally in a database, or both. In the prepaid model, every time a purchase is made, the individual can purchase less gasoline within the specific time interval, until the value in the card is exhausted. The license card might have stored monetary value which can be used to pay the vendor. Or the license card might just store information representing rights to purchase. In addition, the purchase can be used to trigger payment of funds to the vendor and or the government (if the government had not been paid for the tax after the prepayment was made). The payment can be from monetary value stored in the card itself or from use of the card to trigger electronic transfer of funds.

Alternatively, if purchases are made prospectively by accessing the central system (step 814), each purchase is recorded in the central database. The purchaser can continue to make purchases, at a progressively higher disincentive cost per unit volume (or collection of unit volumes of gasoline). Conceivably, at some point, the system might make the upper limit of consumption prohibitively expensive or even foreclose the possibility of further purchase within the licensed time interval.

At step 818, the system tests whether the license has expired before the end of the licensed time interval. If the license was associated with prepayment, and the individual has already purchased his maximum allocation of gasoline before the licensed interval has ended, the question is whether he has the right to "upgrade" and obtain the right to additional purchases within the licensed time interval. If after step 818, the answer is yes, the individual can "upgrade" and purchase additional rights in step 820. He can, for example, "upgrade" from the lowest amount of unit volumes per interval to a middle amount of unit volumes per interval. Alternatively, as an example, he can "upgrade" from the middle amount of unit volumes per interval to the highest amount of unit volumes per interval. There may be an additional cost for the "upgrade", in that the individual does not simply buy another license at the same rate, as though he were starting at the beginning of the year. Instead, he must pay for the difference between what he would have paid had he bought a license for the new total amount in the first instance, and what he actually paid for the original smaller amount, so that he pays the higher per-unit-volume even for the gasoline consumed under his original smaller license. In another version, the model imposes a further penalty for the upgrade to provide yet additional disincentives to purchase gasoline, at least at such a heavy rate. The penalty might be in the form of an even higher per-unit-volume rate than if the individual had purchased a license for that many unit volumes in the first instance, or it could simply be a flat fee for not choosing the correct amount in the first instance.

If the individual made prospective purchases accessing the central system in step 814, his license presumably does not expire in step 818, and he continues to be able to make purchases within the licensed time interval, except the disincentive cost per unit volume (or range of unit volumes) becomes progressively higher with heavier consumption. Again, conceivably at some point, the system might make the upper limit of consumption prohibitively expensive or even foreclose the possibility of further purchase within the licensed time interval.

At step 818, if the license still has remaining "prepaid funds" when the licensed time interval has ended, and in step 822, if there is no potential to roll over the remaining prepaid funds for use beyond the licensed time interval, the method terminates in step 826. Further, if the system does not use prepaid funds, but uses a central system to access a database of rights to make future prospective purchases, such purchases being associated with progressively higher disincentive costs per collection of unit volumes, if there is also no potential to roll over use of the license after the licensed time interval ends, then method terminates at step 826.

If there is potential to roll over remaining prepaid funds, at step 824, the individual continues use until the funds have been exhausted. Then he may purchase a new license. If the maximum consumption allowed under the new license is inadequate for the individual's intended needs within the licensed time interval, in step 828 the individual can "upgrade" as described previously in step 820. If the new license is adequate for the individual's needs, the method terminates at step 830.

In the variant of this method which accesses step 814 (the use of a central database to calculate real time disincentive costs per collection of unit volumes), even though there is no prepayment, there might still be a time limit related to rights to use the license over time. If registration is required at some time interval, or if the licensee opts out of the system for some time interval, the licensee intending to participate again would need to restart the process at step 814.

Figure 9:
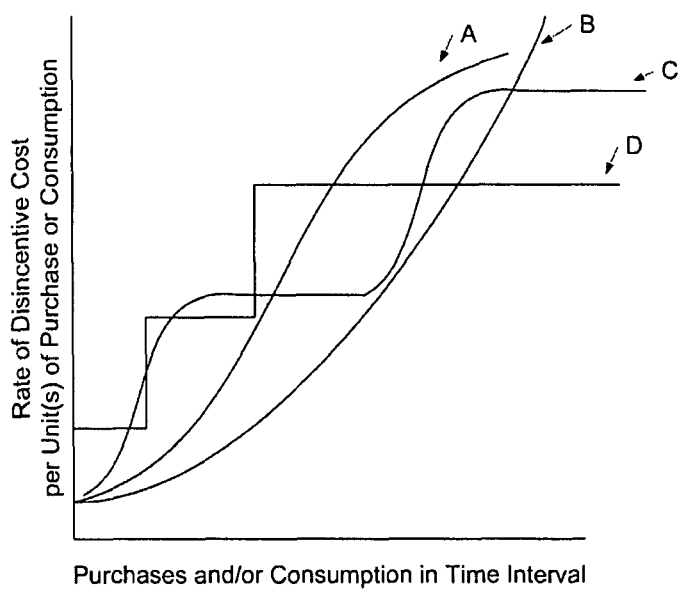
FIG. 9 is a graphical illustration of ways that the disincentive cost can vary with increased purchasing and/or consumption of addictive commodities.

FIG. 9 is a graphical illustration of some, but not all, of the ways that the disincentive cost can be increased nonlinearly with increased purchasing and/or consumption of addictive commodities. In the graph, the "y" axis represents the disincentive cost/unit(s) of purchase or consumption. The "x" axis represents the amount of purchase or consumption. The different rates of purchase or consumption in a licensed time interval can be associated with different disincentive rates. As used herein, "nonlinear" includes combinations of linear patterns. And a linear rate of increase in disincentive cost (based on increased purchasing or consumption ) may be associated with a nonlinear increase in disincentive cost (based on increased purchasing or consumption). Curve A is a representative sigmoid curve. Curve B is a representative exponential curve. Curve C is a representative sigmoid curve stair-step pattern. Curve D is a representative straight-line stair-step pattern. Other curves which allow for different disincentive rates for different amounts of purchasing or consumption in a licensed time interval are allowed.

However, the disincentive cost is calculated, it may be incorporated into the license fee. As used herein and in the claims which follow, the term "license fee" includes, in addition to the administrative costs of issuing a license and administering the licensing system, at least some, and possibly all, of the disincentive cost. The "license fee" also may include at least some, and possibly all, of the purchase price. At least part, and possibly all, of both the license fee and the purchase price may be charged later than the time of issuance of the license, such as at the point of sale, but such an arrangement would still be considered issuance of the license for a license fee. And the purchase price may represent simply the commodity price, or may itself have built in some degree of disincentive cost based on degree of consumption.

Figure 10:
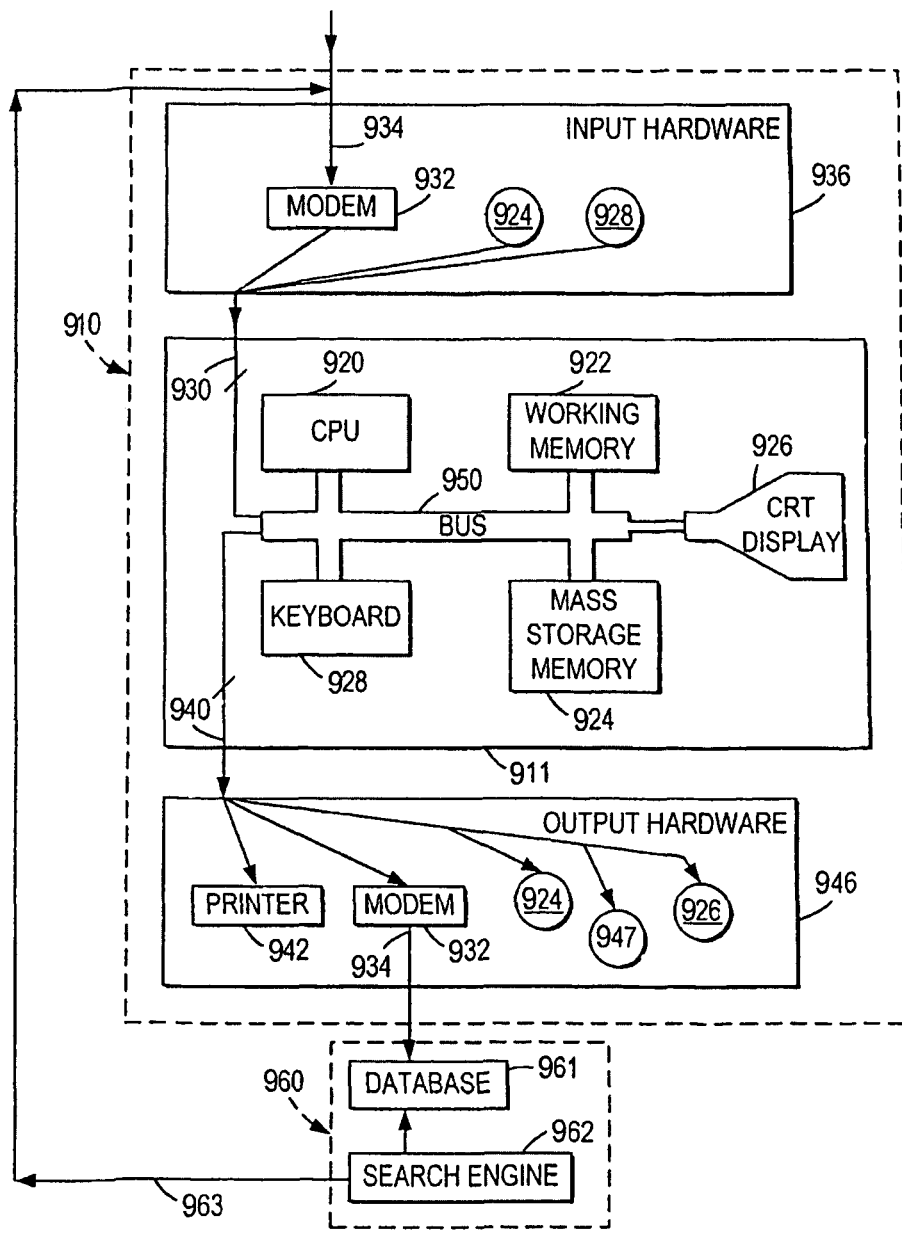
FIG. 10 is a schematic view of a preferred embodiment of a hardware system for implementing the present invention.

An exemplary computer hardware system 910 with which the present invention may be implemented is shown in FIG. 10. In FIG. 10, which shows a preferred embodiment of apparatus according to the invention, system 910 includes a computer 911 comprising a central processing unit ("CPU") 920, a working memory 922 which may be, e.g., RAM (random-access memory) or "core" memory, mass storage memory 924 (such as one or more disk drives or CD-ROM drives), one or more display terminals 926, one or more keyboards 928, one or more input lines 930, and one or more output lines 940, all of which are interconnected by a conventional bidirectional system bus 950.

System 910 can be used to take license applications and issue licenses. System 910 can also be used to keep track of purchases, cutting off further purchases when a purchaser has already purchased his licensed quantity (in a central database type of embodiment).

Input hardware 936, coupled to computer 911 by input lines 930, may be implemented in a variety of ways. Modem or modems 932, which also may be routers or other computer-to-computer communications devices, connected by a telephone line or dedicated data line (such as a T1 or T3 line) 934 can be used to allow direct dial-up access. Modems/routers 932 also may be used to allow access from the Internet. Alternatively or additionally, the input hardware 930 may comprise CD-ROM drives or disk drives 924. In conjunction with display terminal 926, keyboard 928 may also be used as an input device. For example, application data may be entered through one or more keyboards 928, as may data from a point-of-sale transaction such as the purchaser's license number and the quantity sought to be purchased. In addition, point-of-sale input hardware 836 may include a bar-code reader, another optical reader, or a magnetic stripe reader (not shown) to read information directly from a license.

Output hardware 946, coupled to computer 911 by output lines 940, may similarly be implemented by conventional devices. By way of example, output hardware 946 may include display terminal 926, as well as a printer or other printing device 942 for issuing license credentials in an embodiment in which such credentials are used.

Output hardware 946 preferably also includes a payment unit 947 for disbursing funds to licensed purchasers who become eligible for incentive payments for surrendering their licenses. Payment unit 947 could be a check printer if payment is made by check. Alternatively, payment unit 947 could be an electronic funds transfer unit that, using modem/router 932, communicates with the purchaser's bank to transfer funds directly to the purchaser's account.

In operation, CPU 920 coordinates the use of the various input and output devices 936, 946, coordinates data accesses from mass storage 924 and accesses to and from working memory 922, and determines the sequence of data processing steps.

Thus it is seen that a system and method for imposing variable pricing for addictive commodities, which can used to discourage consumption of those commodities, is provided. One skilled in the art will appreciate that the present invention can be practiced by other than the described embodiments, which are presented for purposes of illustration, and not of limitation, and the present invention is limited only by the claims which follow.

What is claimed is:

1. A method of controlling consumption of a commodity, said method comprising:
   issuing a license, in advance of any purchase, to a purchaser of said commodity, said license allowing purchase of a specified quantity of said commodity within a specified time period; wherein:
   said license is issued for a license fee, said license fee being set according to a first schedule that divides said specified quantity into ranges of numbers of units of said commodity, and charges different per unit base fees for different said ranges, said per unit fees increasing as the numbers of units of said commodity in said ranges increase; and
   at a point of sale of a purchased quantity of said commodity to said purchaser:
   using an electronic point-of-sale device to electronically check said license to verify that said specified quantity is not exceeded by said purchased quantity in combination with prior purchases under said license and completing sale of said purchased quantity only when said specified quantity is not exceeded, and
   electronically recording said purchased quantity against said license.

2. The method of claim 1 wherein said per unit fees increase nonlinearly.

3. The method of claim 1 wherein:
   said issuing comprises establishing a record in an electronic database; and
   said recording comprises recording data to said electronic database.

4. The method of claim 1 wherein:
   said issuing comprises delivering a license credential to said purchaser; and
   said recording comprises recording data electronically on said credential.

5. The method of claim 4 wherein said recording on said credential further comprises making a visible mark on said credential.

6. The method of claim 1 further comprising:
   when said specified quantity is consumed prior to termination of said specified period, issuing to said purchaser a further license for an additional specified quantity during said specified period; wherein:
   said further license is issued for a further license fee, said further license fee being set according to a renewal schedule that divides said specified quantity into ranges, and charges different per unit renewal fees for different said ranges, said per unit renewal fees being higher than said per unit base fees and increasing as said ranges increase.

7. The method of claim 1 further comprising:
   when said purchaser surrenders said license prior to termination of said specified period without purchasing all of said specified quantity, awarding an incentive to said purchaser.

8. The method of claim 7 wherein said incentive comprises a product that encourages cessation of consumption of said commodity.

9. The method of claim 1 further comprising:
   when said purchaser surrenders said license prior to termination of said specified period without purchasing all of said specified quantity, and subsequently purchases a further license, issuing said further license for a further license fee, said further license fee being set according to a repurchase schedule that divides said specified quantity into ranges, and charges different per unit repurchase fees for different said ranges, said per unit repurchase fees being higher than said per unit base fees and increasing as said ranges increase.

10. The method of claim 1 wherein, at said point of sale, purchase price for said commodity is determined electronically by said point-of-sale device based on frequency and amount of said prior purchases under said license.

11. The method of claim 1 wherein:
    said license fee comprises prepayment of purchase price of said specified quantity of said commodity; and
    said recording comprises electronically debiting against said prepayment.

12. Apparatus for controlling consumption of a commodity, said apparatus comprising:
    a license issuing unit that issues a license, in advance of any purchase, to a purchaser of said commodity, said license allowing purchase of a specified quantity of said commodity within a specified time period; wherein:
    said license issuing unit issues said license for a license fee, said license fee being set according to a first schedule that divides said specified quantity into ranges of numbers of units of said commodity, and charges different per unit base fees for different said ranges, said per unit fees increasing as the numbers of units of said commodity in said ranges increase.

13. The apparatus of claim 12 wherein said per unit fees increase nonlinearly.

14. The apparatus of claim 12 wherein:
    said license issuing unit generates a license credential for delivery to said purchaser, said license credential having thereon a storage medium for recording purchases of said commodity on said credential.

15. The apparatus of claim 12 wherein:
    said license issuing unit establishes, in a database, a record corresponding to said license, said apparatus further comprising:
    a point of sale terminal in communication with said database that, on sale of a purchased quantity of said commodity to said purchaser, checks said record corresponding to said license to verify that said specified quantity is not exceeded by said purchased quantity in combination with prior purchases under said license and completing sale of said purchased quantity only when said specified quantity is not exceeded, and
    recording said purchased quantity in said record corresponding to said license.

16. The apparatus of claim 15 wherein:
    said license fee comprises prepayment of purchase price of said specified quantity of said commodity; and
    said point of sale terminal debits said purchased quantity against said prepayment.

17. The apparatus of claim 15 wherein said point of sale terminal determines purchase price for said commodity based on frequency and amount of said prior purchases under said license.

18. The apparatus of claim 12 wherein:
when said specified quantity is consumed prior to termination of said specified period, said license issuing unit issues to said purchaser a further license for an additional specified quantity during said specified period; and
said further license is issued for a further license fee, said further license fee being set according to a renewal schedule that divides said specified quantity into ranges, and charges different per unit renewal fees for different said ranges, said per unit renewal fees being higher than said per unit base fees and increasing as said ranges increase.

19. The apparatus of claim 12 wherein:
when said purchaser surrenders said license prior to termination of said specified period without purchasing all of said specified quantity, and subsequently purchases a further license, said license issuing unit issues said further license for a further license fee, said further license fee being set according to a repurchase schedule that divides said specified quantity into ranges, and charges different per unit repurchase fees for different said ranges, said per unit repurchase fees being higher than said per unit base fees and increasing as said ranges increase.

20. The apparatus of claim 12 wherein, at said point of sale, purchase price for said commodity is determined based on frequency and amount of said prior purchases under said license.

* * * * *